United States Patent [19]

Yokotani et al.

[11] Patent Number: 4,885,661
[45] Date of Patent: Dec. 5, 1989

[54] MULTI-LAYER CERAMIC CAPACITOR

[75] Inventors: Yoichiro Yokotani, Suita; Hiroshi Kagata, Neyagawa; Hiroshi Niwa, Chitose; Junichi Kato, Osaka; Toshihiro Mihara, Hirakata, all of Japan

[73] Assignee: Matsushita Electric Industrial Co., Ltd., Osaka, Japan

[21] Appl. No.: 262,501

[22] Filed: Oct. 18, 1988

[51] Int. Cl.$^4$ .................... H01G 1/005; H01G 4/06; C04B 35/46

[52] U.S. Cl. ........................... 361/321; 264/61; 501/136

[58] Field of Search ........ 361/321, 320, 322, 328-330; 264/61; 252/62.3; 29/25.42; 501/134-138

[56] References Cited

U.S. PATENT DOCUMENTS

| | | | |
|---|---|---|---|
| 3,920,781 | 11/1975 | Eror et al. | 264/61 |
| 4,054,532 | 10/1977 | Hanke et al. | 361/320 X |
| 4,101,952 | 7/1978 | Burn | 361/320 X |
| 4,115,493 | 9/1978 | Sakabe et al. | 264/61 |
| 4,265,668 | 5/1981 | Fujiwara et al. | 501/136 X |
| 4,607,314 | 8/1986 | Wada et al. | 264/61 X |
| 4,752,858 | 6/1988 | Yokotani et al. | 361/321 |

Primary Examiner—Donald A. Griffin
Attorney, Agent, or Firm—Wenderoth, Lind & Ponack

[57] ABSTRACT

A mutli-layer ceramic capacitor principally made up of (a) internal electrode layers containing at least copper and (b) ceramic dielectric layers extending between the internal electrode layers. The materials which form the ceramic include copper oxide and an oxide component A and B, which component A is selected from group I of lead, calcium, strontium, and barium, and component B is selected from group II of magnesia, nickel, titanium, zirconium, zinc, niobium, tantalum, and tungsten. The component A includes at least lead and component B includes at least two of the substances in group II, and wherein a ratio between values a and b are chosen so that $0.985 < a/b < 1.110$, where the value a denotes the total mol value of the substances in the component A and the value b denotes the total mol value of the substances in component B. The copper oxide component is present in an amount of about 0.03 to 0.65 wt % in terms of $Cu_2O$ content.

6 Claims, 1 Drawing Sheet

MULTI-LAYER CERAMIC CAPACITOR

BACKGROUND OF THE INVENTION

This invention generally relates to multi-layer ceramic capacitors, and particularly relates to multi-layer ceramic capacitors having high reliability, high specific resistivities especially at high temperature and low dielectric loss at high frequencies, and including an inexpensive electrode therefore.

Recently, multi-layer ceramic capacitors are widely used to meet needs of small sized and large capacitance capacitors. Conventional electrolytic capacitors generally have large capacitances, but can not operate normally at a high frequencies. Therefore, in high frequency circuits, multi-layer ceramic capacitors are used at points where large capacitances are necessary. In general, multi-layer ceramic capacitors are produced by the step of co-firing internal electrodes and dielectric ceramics. Multi-layer ceramic capacitors of the high dielectric constant type conventionally include barium titanate ($BaTiO_3$) based ceramics. Since the firing temperature of this material is high e.g., about 1300° C., the internal electrodes of such capacitors should be made of materials such as platinum (Pt) and palladium (Pd), which are expensive.

Proposed multi-layer ceramic capacitors use $BaTiO_3$ based materials which can be fired in atmosphere or ambient gas of low partial pressure oxygen and have internal electrodes made of a base metal such as nickel (Ni).

U.S. Pat. No. 3,920,781 discloses a method of manufacturing a multi-layer ceramic capacitor which uses acceptor dopant $BaTiO_3$ based dielectric materials and which has an internal electrode made of a base metal such as nickel (Ni), cobalt (Co), or iron (Fe).

U.S. Pat. No. 4,115,493 discloses a multi-layer ceramic capacitor which uses dielectric materials made by doping or adding calcium (Ca) to a $BaTiO_3$ based material. In this case, the ratio A/B is chosen to be 1.005–1.03 where the letter A denotes sum of the mole ratio of Ba and Ca while the letter B denotes the sum of the mole ratios of the other cations. In addition, this multi-layer ceramic capacitor has an internal electrode made of nickel.

In these multi-layer ceramic capacitors, since dielectric materials consists of $BaTiO_3$ based material whose firing temperature is higher than the melting point of copper (Cu), a base metal such as nickel (Ni) is used as an internal electrode in place of Copper. A base metal such as nickel has a lower equilibrium oxygen partial pressure than that of copper which have the following disadvantages. When dielectric ceramics are fired together with internal electrodes made of a base metal such as nickel, the dielectric ceramics are exposed to the equilibrium oxygen partial pressure of the base metal at the firing temperature so that the dielectric ceramics tend to be reduced and to have low resistivities.

U.S. Pat. No. 4,752,858 discloses a multi-layer ceramic capacitor which uses dielectric materials of low temperature sintering ceramics including an oxide containing a component A and a component B, the component A being selected from a group I of lead, calcium, strontium, and barium, the component B being selected from a group II of magnesium, nickel, titanium, zinc, niobium, and tungsten, the component A including lead and at least one of the other substance in the group I, the component B including at least two of the substances in the group II, the ratio between values a and b being chosen so that a/b > 1.00, the internal electrode containing at least copper.

In this multi-layer ceramic capacitor, since the dielectric material consists of Pb based complex perovskite materials whose firing temperature is lower than 1080° C., copper can be used as internal electrodes. In addition, since Pb based complex perovskite dielectric materials have higher dielectric constants and have lower dielectric losses than $BaTiO_3$ based materials especially in high D.C. and A.C. bias voltage fields, multi-layer ceramic capacitors employing these dielectric materials have large capacities and low loss factors. But since the sintering bodies of these dielectric materials does not have sufficient density and have low specific resistivity at high temperature, the multi-layer ceramic capacitors do not have enough reliability in high temperature and in high humidity.

SUMMARY OF THE INVENTION

It is an object of this invention to provide a multi-layer ceramic capacitor which has high reliability, high specific resistivity at high temperature, and low loss factor at high frequencies, and which has inexpensive electrodes.

In accordance with this invention, a multi-layer ceramic capacitor includes dielectric ceramics extending between internal electrode layers. The dielectric ceramics mainly include an oxide containing a component A and a component B. The component A is selected from group I of lead (Pb), calcium (Ca), strontium (Sr), and barium (Ba). The component B is selected from a group II of magnesium (Mg), nickel (Ni), titanium (Ti), zirconium (Zr), zinc (Zn), niobium (Nb), tantalum (Ta), and tungsten (W). The component A includes lead at least. The component B includes at least two of the substances in the group II. A ratio between values a and b is chosen so that $0.985 <= a/b <= 1.110$, where the value a denotes the total mol value of the substances in the component A and the value b denotes the total mol value of the substance in the component B. In addition, the dielectric ceramics further contain copper in an amount of about 0.03 to 0.65 wt% in terms of the $Cu_2O$ content. The internal electrode layers are made of copper or an alloy including copper as a principal component.

The lead basec perovskite used as a dielectric material in the multi-layer ceramic capacitor of this invention has a firing temperature lower than the melting point of copper, therefore, copper or an alloy including copper as a principal component can be used as an internal electrode. Further since the dielectric material of the present invention has a high specific resistivity in a wide range of oxygen partial pressure centered at the equilibrium oxygen partial pressure of copper at firing temperature, a high specific resistivity can be reliably obtained. Since the internal electrodes are at least principally made of copper which has a relatively high equilibrium oxygen partial pressure in comparison with other base metals, the dielectric ceramic tends not to be reduced during firing and tends not to have a low resistance. In addition, since the copper electrodes are highly conductive and non-magnetic, the copper electrodes do not cause an appreciable dielectric loss at high frequencies even when they are in the form of a plate. Further more since the sintered bodies of the dielectric materials of the present invention have a higher density and higher specific resistivity at high temperature than that of the ceramics without copper oxide, ceramics of a high reliability at high temperature or in high humidity can be obtained.

DESCRIPTION OF THE PREFERRED EMBODIMENTS

Figure 1:
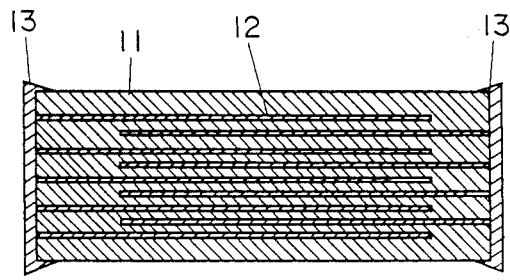
FIG. 1 is a sectional view of a multi-layer ceramic capacitor according to an embodiment of this invention.

Materials A, B, C, D, E, F, G, H, and J expressed by the following chemical formulas were used for ceramic dielectrics of multi-layer ceramic capacitors. Materials H and J are the examples for comparison and are outside the range of limitation in this invention.

| | |
|---|---|
| A: | $Pb_{1.02}(Mg_{\frac{1}{3}} Nb_{\frac{2}{3}})_{0.70} Ti_{0.18}$ $(Ni_{\frac{1}{2}} W_{\frac{1}{2}})_{0.12} O_{3.02} + Cu_2O$ 0.03 wt % |
| B: | $Pb_{1.02}(Mg_{\frac{1}{3}} Nb_{\frac{2}{3}})_{0.70} Ti_{0.18}$ $(Ni_{\frac{1}{2}} W_{\frac{1}{2}})_{0.12} O_{3.02} + Cu_2O$ 0.20 wt % |
| C: | $Pb_{1.02}(Mg_{\frac{1}{3}} Nb_{\frac{2}{3}})_{0.70} Ti_{0.18}$ $(Ni_{\frac{1}{2}} W_{\frac{1}{2}})_{0.12} O_{3.02} + Cu_2O$ 0.65 wt % |
| D: | $Pb_{0.985}(Ni_{\frac{1}{2}} Nb_{\frac{1}{2}})_{0.79} Ti_{0.21}$ $O_{2.985} + Cu_2O$ 0.65 wt % |
| E: | $Pb_{1.110}(Mg_{\frac{1}{3}} Nb_{\frac{2}{3}})_{0.90} Zr_{0.10}$ $O_{3.110} + Cu_2O$ 0.03 wt % |
| F: | $(Pb_{0.99} Ca_{0.01}) (Mg_{\frac{1}{3}} Nb_{\frac{2}{3}})_{0.80}$ $(Zn_{\frac{1}{3}} Ta_{\frac{2}{3}})_{0.05} (Mg_{\frac{1}{2}} W_{\frac{1}{2}})_{0.15}$ $O_{3.000} + Cu_2O$ 0.20 wt % |
| G: | $(Pb_{0.98} Ca_{0.02} Sr_{0.01} Ba_{0.01})$ $(Mg_{\frac{1}{3}} Nb_{\frac{2}{3}})_{0.70} Ti_{0.20}$ $(Ni_{\frac{1}{2}} W_{\frac{1}{2}})_{0.10} O_{3.02} + Cu_2O$ 0.35 wt % |
| H: | $Pb_{1.02}(Mg_{\frac{1}{3}} Nb_{\frac{2}{3}})_{0.70} Ti_{0.18}$ $(Ni_{\frac{1}{2}} W_{\frac{1}{2}})_{0.12} O_{3.02}$ with no $Cu_2O$ |
| J: | $Pb_{1.02}(Mg_{\frac{1}{3}} Nb_{\frac{2}{3}})_{0.70} Ti_{0.18}$ $(Ni_{\frac{1}{2}} W_{\frac{1}{2}})_{0.12} O_{3.02} + Cu_2O$ 1.0 wt % |

Dielectric powder was produced in a conventional way of manufacturing ceramics. The dielectric powder was calcinated at a temperature of 760° C. for 4 hours. The calcined materials were crushed and then milled with a partially stabilized zirconia ball having a diameter of 1 mm in water for 17 hours. After filtration and drying, the calcinated powder was mixed with polyvinyl butyral resin and a solvent in a ball mill. The polyvinyl butyral resin serves as binder. The mixing ratio or quantity of the polyvinyl butyral binder was 5 weight percent (wt%) with respect to the quantity of the calcined powder, and the mixing ratio or quantity of the solvent was 53 wt% with respect to the quantity of the calcined powder. The resulting mixture was formed by a doctor blade into a sheet having a thickness of 35 μm.

Materials K and L expressed by the following chemical formulas were used for starting materials of internal electrodes.

| | |
|---|---|
| K: | CuO |
| L: | CuO = 3.5 wt % Ag |

An electrode made of the material L will be described below. Copper oxide (CuO) powder and silver metal (Ag) powder both containing grains with diameters of 0.3–1.0 μm were mixed at a predetermined ratio. The resulting powder was mixed by a three roll mill with butyral resin and a solvent and was then formed into an electrode paste. The butyral resin serves as binder. The mixing ratio or quantity of the butyral binder was 7 wt% with respect to quantity of the powder. The mixing ratio or quantity of the solvent was 36 wt% with respect to quantity of the powder.

Electrode paste was also prepared from the material K in a similar way.

A pattern of internal electrodes was printed on the dielectric green sheet in a screen printing process by use of the electrode paste. The dielectric green sheets having the printed internal electrode patterns were laminated in such a manner that the internal electrodes project alternately in opposite directions, e.g., project alternately leftward and rightward. Then, the laminated green sheets were cut and formed into laminated chips.

In this way, a laminated body was produced which has dielectric green sheets and internal electrodes. The laminated body thus produced was placed on coarse magnesia within a ceramic boat and the binder was burned out at a temperature of 650° C. in air. The burned out body thus produced was cooled to a temperature of 450° C., and then 0.05% $H_2$-$N_2$ gas (a mixture of 0.05% hydrogen gas and 99.95% nitrogen gas) was supplied into a boat and the internal electrode layers were redacted to metal for 10 hours.

Figure 2:
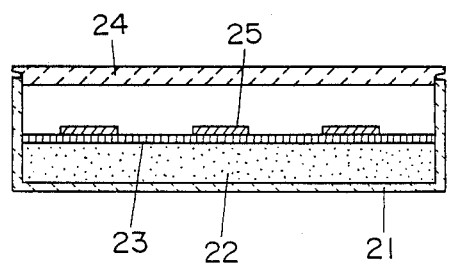
FIG. 2 is a sectional view of a magnesia ceramic container and its contents.
Figure 3:
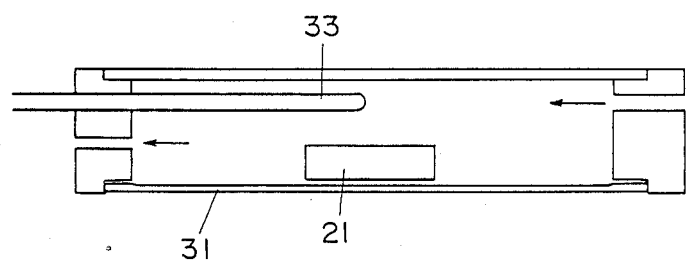
FIG. 3 is a section view of a tube furnace during firing.

FIG. 2 shows a magnesia ceramic container accommodating the laminated body during firing. FIG. 3 shows a furnace aluminum tube. As shown in FIG. 2 the previously-mentioned calcined powder 22 was laid or placed flat on an inner bottom surface of a magnesia ceramic container 21. The volume of the calcined powder 22 was approximately one-third of the volume of the container 21. Magnesia powder (MgO) 23 of 100 mesh was laid or placed flat on the layer of the calcinated powder 22. The thickness or depth of the layer of the magnesia powder 23 was approximately 1 mm. The metallized laminated bodies 25 were placed on the magnesia powder layer 23. Then the container 21 was closed by a magnesia ceramic lid 24. As shown in FIG. 3 the closed container 21 was inserted into an aluminum tube 31 in a furnace. After the aluminum tube 31 was evacuated, $N_2$-CO-$CO_2$ gas (a mixture of nitrogen gas, carbon monoxide gas and carbon dioxide gas) was continuously supplied into the aluminum tube 31. During the continuous supply of the mixture, the oxygen partial pressure within the aluminum tube 31 was monitored as will be described hereinafter, and the mixing ratio between the carbon monoxide gas and the carbon dioxide gas was adjusted so that the oxygen partial pressure within the aluminum tube 31 was regulated at a predetermined level. The aluminum tube 31 was exposed to the following temperature control while receiving the continuous supply of the gas mixture. First, the aluminum tube 31 was heated to a preset temperature at a rate of 400° C./hr. Second, the temperature of the aluminum tube 31 was maintained at this preset temperature for two hours. Third, the aluminum tube 31 was cooled at rate of 120° C./hr.

An yttrium oxide stabilized zirconia oxygen sensor 33 was previously inserted into the aluminum tube 31. This sensor includes a first platinum electrode exposed to the atmosphere and second platinum electrode exposed to the gas mixture within the aluminum tube 31. The oxygen partial pressure PO2 within the aluminum tube 31 was derived from the voltage E (volt) between the electrodes of the sensor 33 by referring to the following equation.

$$PO2 = 0.2 \exp(4FE/RT)$$

where the character F denotes a Faraday constant equal to 96,489 coulombs, the character R denotes a gas constant equal to 8.3114 J/deg. mol, and the character T denotes the absolute temperature of the gas mixture or the aluminum tube 31.

After firing the laminated body, terminations were formed by applying the electrode paste which consist of metal copper powder, glass powder, organic binder, and solvent to opposite faces of a laminated chip from which the internal electrodes project, and then fired in pure nitrogen gas flow atmosphere at 700° C. for 10 minutes.

The dimensions of the resulting laminated capacitor element was $2.8 \times 1.4 \times 0.9$ mm. The effective electrode area per layer was 1.3125 mm$^2$ ($1.75 \times 0.75$ mm). The thickness of the electrode layer was 2.0 $\mu$m. The thickness of the dielectric ceramic layer was 25 $\mu$m. The number of the effective dielectric ceramic layers was 30. Two non-electrode layers were provided at each of opposite ends of the laminated capacitor element.

Table 1 indicates various characteristics of eighteen samples (denoted by the numerals 1-18) of multi-layer ceramic capacitors of this invention and indicates conditions during the productions these samples. Specifically, Table 1 contains the compositions of the dielectric materials, the compositions of the electrodes, the firing temperatures, the oxygen partial pressure of the atmosphere or ambient gases during firing, the capacitance of the capacitors at a temperature of 20° C., the dielectric losses represented by tan $\delta$ of the capacitors at a temperature of 20° C., the specific resistances or resistivities of the capacitors at a temperature of 20° C. and 125° C., and the surviving numbers after 500 hr. exposed to a temperature of 80° C. and a humidity of 85% and with 25 volt D.C. vias voltage applied. The capacitances and the tan $\delta$ of the multi-layer ceramic capactior elements were measured under conditions where an AC voltage having an amplitude of 1 volt and a frequency in the range of 1 kHz-2 MHz was applied across the capacitor elements. The specific resistances of the capacitor elements were derived from voltages across the capacitor elements which occurred at a moment one minute after the end of the application of a voltage of 50 volts D.C. to the capacitor elements. The surviving numbers were the number of the multi-layer ceramic capacitors with the specific resistivity up to $1 \times 10^8$ $\Omega$ after being exposed to the atmosphere previously mentioned. The testing number of this measurement was sixteen per each sample.

FIG. 1 shows a multi-layer ceramic capacitor of this invention. As shown in FIG. 1, the capacitor includes dielectric ceramics layers 11 and internal electrode layers 12 extending between the dielectric ceramic layers 11. The internal electrode layers 12 are made of copper or an alloy principally containing copper. The internal electrode layers 12 are alternately connected to one end electrode (termination) 13 and the other end electrode (termination) 13. The two terminations or end electrodes 13 are fixed to opposite faces of a laminated body of the capacitor. The end electrodes 13 are also made of copper or an alloy principally containing copper.

In a multi-layer ceramic capacitor of this invention, the ceramic dielectrics include an oxide containing a component A and component B. The component A is selected from a group I of lead, calcium, strontium, and barium. The component B is selected from a group II of magnesium, nickel, titanium, zirconium, zinc, niobium, tantalum, and tungsten. The component A includes lead at least. The component B includes at least two of substances in group II. The ratio between values a and b is chosen to be $0.985 < = a/b < = 1.110$ where the value A denotes the total mol value of the substances in the component A and the value b denotes the total mol value of the substances in the component B. In addition the dielectric ceramic further contains copper in an amount of about 0.03 to 0.65 wt% in terms of Cu$_2$O content. In this invention, the combination of the dielectric ceramic compositions and the internal electrode compositions containing of copper makes for a capacitor which has a high resistivity, a low dielectric loss and high reliability. These ceramic dielectrics have high resistivities when fired with copper inner electrodes and can be fired under the temperature of the melting point of copper. Accordingly, the invention allows inexpensive copper to be used as electrodes. Furthermore, these ceramic dielectrics have a high density in respect to the sintered body and have high specific resistivity at high temperature. Accordingly, the multi-layer ceramic capacitors employing these dielectrics hav a high reliability at high temperature or in a high humidity atmosphere.

TABLE 1

| No. | DIELECTRIC MATERIAL | ELECTRODE MATERIAL | FIRING TEMP. (°C.) | OXYGEN PERTIAL PRESSURE PO2 (atm) | CAPACITANCE 20° C. 1 kHz (nF) | tan $\delta$ ($\times 10^{-4}$) 1 kHz | tan $\delta$ ($\times 10^{-4}$) 100 kHz | tan $\delta$ ($\times 10^{-4}$) 1 MHz | tan $\delta$ ($\times 10^{-4}$) 2 MHz | RESISTIVITY ($\Omega$) 20° C. | RESISTIVITY ($\Omega$) 125° C. | SURVIVING NUMBERS (/16) |
|---|---|---|---|---|---|---|---|---|---|---|---|---|
| 1 | A | K | 950 | $1 \times 10^{-6}$ | 213 | 98 | 96 | 234 | 754 | $3.0 \times 10^{+11}$ | $8.0 \times 10^{+9}$ | 14 |
| 2 | A | K | 950 | $3 \times 10^{-7}$ | 206 | 87 | 74 | 201 | 643 | $4.5 \times 10^{+11}$ | $7.5 \times 10^{+9}$ | 13 |
| 3 | B | K | 950 | $1 \times 10^{-6}$ | 221 | 45 | 32 | 245 | 354 | $6.0 \times 10^{+10}$ | $1.0 \times 10^{+10}$ | 15 |
| 4 | B | K | 950 | $3 \times 10^{-7}$ | 231 | 36 | 31 | 203 | 322 | $7.5 \times 10^{+10}$ | $1.2 \times 10^{+10}$ | 16 |
| 5 | C | L | 880 | $2 \times 10^{-6}$ | 198 | 45 | 32 | 279 | 378 | $2.5 \times 10^{+10}$ | $1.5 \times 10^{+10}$ | 15 |
| 6 | C | L | 880 | $5 \times 10^{-7}$ | 206 | 60 | 76 | 323 | 567 | $4.0 \times 10^{+10}$ | $1.0 \times 10^{+10}$ | 16 |
| 7 | D | L | 880 | $2 \times 10^{-6}$ | 124 | 78 | 89 | 243 | 789 | $4.5 \times 10^{+11}$ | $5.5 \times 10^{+10}$ | 16 |
| 8 | D | L | 880 | $5 \times 10^{-7}$ | 116 | 81 | 69 | 254 | 754 | $6.0 \times 10^{+11}$ | $4.0 \times 10^{+10}$ | 16 |
| 9 | E | L | 830 | $4 \times 10^{-6}$ | 87 | 32 | 31 | 201 | 345 | $1.5 \times 10^{+11}$ | $5.5 \times 10^{+9}$ | 14 |
| 10 | E | L | 830 | $7 \times 10^{-7}$ | 76 | 36 | 25 | 231 | 406 | $1.0 \times 10^{+11}$ | $5.0 \times 10^{+9}$ | 14 |

TABLE 1-continued

| No. | DIELECTRIC MATERIAL | ELECTRODE MATERIAL | FIRING TEMP. (°C.) | OXYGEN PARTIAL PRESSURE PO$_2$ (atm) | CAPACITANCE 20° C. 1 kHz (nF) | tan δ (× 10$^{-4}$) | | | | RESISTIVITY (Ω) | | SURVIVING NUMBERS (/16) |
|---|---|---|---|---|---|---|---|---|---|---|---|---|
| | | | | | | 1 kHz | 100 kHz | 1 MHz | 2 MHz | 20° C. | 125° C. | |
| 11 | F | K | 950 | $1 \times 10^{-6}$ | 113 | 67 | 78 | 214 | 567 | $6.0 \times 10^{+10}$ | $1.0 \times 10^{+10}$ | 15 |
| 12 | F | K | 950 | $3 \times 10^{-7}$ | 106 | 63 | 54 | 279 | 651 | $7.5 \times 10^{+10}$ | $1.5 \times 10^{+10}$ | 16 |
| 13 | G | K | 950 | $1 \times 10^{-6}$ | 105 | 23 | 23 | 241 | 789 | $3.5 \times 10^{+10}$ | $1.0 \times 10^{+10}$ | 16 |
| 14 | G | K | 950 | $3 \times 10^{-7}$ | 101 | 34 | 31 | 301 | 687 | $2.5 \times 10^{+10}$ | $1.5 \times 10^{+10}$ | 16 |
| *15 | H | K | 980 | $9 \times 10^{-5}$ | 206 | 33 | 38 | 351 | 641 | $6.5 \times 10^{+11}$ | $1.2 \times 10^{+9}$ | 4 |
| *16 | H | K | 980 | $2 \times 10^{-7}$ | 198 | 42 | 47 | 401 | 768 | $5.0 \times 10^{+11}$ | $9.0 \times 10^{+8}$ | 8 |
| *17 | J | L | 830 | $4 \times 10^{-6}$ | 101 | 106 | 112 | 532 | 876 | $4.5 \times 10^{+9}$ | $1.0 \times 10^{+9}$ | 12 |
| *18 | J | L | 830 | $7 \times 10^{-7}$ | 103 | 124 | 147 | 654 | 980 | $3.0 \times 10^{+9}$ | $1.0 \times 10^{+9}$ | 10 |

We claim:

1. A multi-layer ceramic capacitor comprising:
   (a) internal electrode layers; and
   (b) ceramic dielectric layers extending between the internal electrode layers;
   wherein said ceramic dielectric layers consists of low temperature sintering ceramics including an oxide containing a component A and component B, the component A being selected from a group I of lead, calcium, strontium, and barium, and the component B being selected from group II of magnesia, nickel, titanium, zirconium, zinc, niobium, tantalum, and tungsten, said component A including at least lead, and component B including at least two of the substances in the group II, a ratio between values a and b being chosen so that $0.985 <= a/b <= 1.110$, where the value a denotes the total mol value of the substances in the component A and the value b denotes the total mol value of the substances in the component B, said dielectric ceramic further containing copper oxide in an amount of about 0.03 to 0.65 wt% in terms of Cu$_2$O content, and wherein the sintering temperature of the ceramic is below 1080° C.;
   said internal electrode layers containing at least copper.

2. The capacitor of claim 1 wherein the internal electrode layers essentially consist of copper.

3. The capacitor of claim 1 wherein the internal electrode layers consist of an alloy principally containing copper.

4. The capacitor of claim 1 further comprising an termination electrode directly connected to a preset number of the internal electrode layers and containing at least copper.

5. The capacitor of claim 4 wherein the end electrode essentially consists of copper.

6. The capacitor of claim 4 wherein the end electrode consist of an alloy principally containing copper.

* * * * *